United States Patent
Bera

(10) Patent No.: US 6,636,880 B1
(45) Date of Patent: Oct. 21, 2003

(54) AUTOMATIC CONVERSION OF UNITS IN A COMPUTER PROGRAM

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 09/664,185

(22) Filed: Sep. 18, 2000

(51) Int. Cl.$^7$ ................................................ G06F 7/00
(52) U.S. Cl. ...................................................... 708/206
(58) Field of Search ............................... 708/204, 206

(56) References Cited

U.S. PATENT DOCUMENTS

| | | | |
|---|---|---|---|
| 4,881,189 A | * 11/1989 | Proctor | 708/206 |
| 5,216,627 A | * 6/1993 | McClellan et al. | 708/206 |
| 5,657,259 A | * 8/1997 | Davis et al. | 708/204 |
| 6,263,353 B1 | * 7/2001 | Gross et al. | 708/204 |
| 6,381,621 B1 | * 4/2002 | Hamilton | 708/206 |

OTHER PUBLICATIONS

Reichardt, T., NASA Reworks its Sums after Mars Flasco, Nature Magazine, Oct. 7, 1999, p. 517, vol. 401.

* cited by examiner

*Primary Examiner*—Tan V. Mai
(74) *Attorney, Agent, or Firm*—Manny Schecter; T. Rao Coca

(57) ABSTRACT

A remedial method (200) and apparatus (100) is described, by which unit information can be documented in a computer program. A set of user-supplied precompiler directives is added to the computer program that is to be converted, in which a preferred set of units, called primary units, are prescribed. A precompiler tool performs a conversion of a unit to its corresponding unit in the preferred set of units.

13 Claims, 2 Drawing Sheets

AUTOMATIC CONVERSION OF UNITS IN A COMPUTER PROGRAM

TECHNICAL FIELD OF THE INVENTION

The present invention relates to units in computer programs, and in particular to allowing a computer program to carry units information about its constants, variables, and functions. The units information may be used to introduce conversion factors to ensure that computations in the computer program are carried out in a consistent manner in terms of primary units of the computer program. The present invention relates particularly to a method and apparatus for performing automatic conversion of units used in computer programs.

BACKGROUND ART

Computer programs typically include numerous expressions and functions to assign values to variables. These values often relate to units. Examples of such units and dimensions include meters, seconds, cubic meters, inches, kilograms, meters per second, and many more. One of the deficiencies of programming languages is that no information is kept about the units in which the values are expressed. It is taken for granted that programmers will deal with the units appropriately and without formal documentation of the units in the program.

Therefore, automatic verification of consistency of units in a program, say by a compiler, is not possible in known systems. A failure to correctly do so may lead to serious miscalculations. A simple example of this would be if an algebraic expression containing a variable or constant having units of metres per second is added to another variable or constant with units of centimetres per second or inches per second.

According to the article "NASA Reworks its Sums after Mars Fiasco" by Reichhardt, T., published in Nature, Vol. 401, Oct. 7, 1999, p. 517, the loss of NASA's Mars Climate Orbitor on Sep. 23, 1999, as it was about to enter orbit, has been attributed to a confusion between imperial and metric units.

DISCLOSURE OF THE INVENTION

It is an object of the present invention to provide a method of automatic conversion of units in a computer program.

According to a first aspect of the invention, there is provided a method of converting units in a computer program. The method comprises the steps of:
 (a1) accepting as input a unit identifier for each variable used in the computer program, wherein each unit identifier comprises one or more unit elements;
 (a2) accepting as input a primary unit element from each group of unit elements;
 (a3) accepting as input a relation between each of the unit elements and one of the groups of unit elements and a conversion factor to the primary unit element of the group of unit elements;
 (d) identifying instances of the variables in the computer program;
 (e) augmenting the instances of the variables with a corresponding one of the unit identifiers; and
 (f) identifying for each unit element, one of the groups of units and replacing the unit element with the primary unit identifier, multiplied with the conversion factor.

Preferably, when the computer program further includes at least one assignment statement, the method, for each assignment statement, comprises the further step of:
 (h) dividing both sides of the assignment statement with the conversion factor(s) on the left hand side of the assignment statement.

Also, when the computer program includes at least one function, the method, for each function, preferably comprises the further steps of:
 (a4) accepting as input a unit identifier for the function;
 (a5) accepting as input a unit identifier for each parameter of the function;
 (b) in a function body of the function, converting units by:
  (b1) identifying instances of the variables in the function body;
  (b2) augmenting the instances of the variables with a corresponding one of the unit identifiers;
  (b3) identifying for each unit element, one of the groups of units and replacing the unit element with the primary unit identifier, multiplied with the conversion factor;
  (b4) for each assignment statement in the function body, dividing both sides of the assignment statement with the conversion factor(s) on the left hand side of the assignment statement; and
  (b5) dividing a return statement of the function body with conversion factor(s) of the unit identifier for the function;
 (c1) identifying instances of arguments in function calls of the function in the computer program;
 (c2) augmenting the instances of the arguments with a corresponding one of the unit identifiers; and
 (c3) identifying for each unit element, one of the groups of units and replacing the unit element with the primary unit identifier, multiplied with the conversion factor.
 (g1) identifying instances of the function call in the computer program;
 (g2) augmenting the instances of the function call with a corresponding one of the unit identifiers; and
 (g3) identifying for each unit element, one of the groups of units and replacing the unit element with the primary unit identifier, multiplied with the conversion factor.

According to a further aspect of the invention, there is provided an apparatus for converting units in a computer program. The apparatus comprises:
 input means for:
  accepting as input a unit identifier for each variable used in the computer program, wherein each unit identifier comprise one or more unit elements;
  accepting as input a primary unit element from each group of unit elements; and
  accepting as input a relation between each of the unit elements and one of the groups of unit elements and a conversion factor to the primary unit element of the group of unit elements;
 means for identifying instances of the variables in the computer program;
 means for augmenting the instances of the variables with a corresponding one of the unit identifiers; and
 means for identifying for each unit element, one of the groups of units and replacing the unit element with the primary unit identifier, multiplied with the conversion factor.

BRIEF DESCRIPTION OF THE DRAWINGS

A preferred embodiment of the present invention will now be described with reference to the drawings in which.

DETAILED DESCRIPTION INCLUDING BEST MODE

Apparatus

Figure 1:
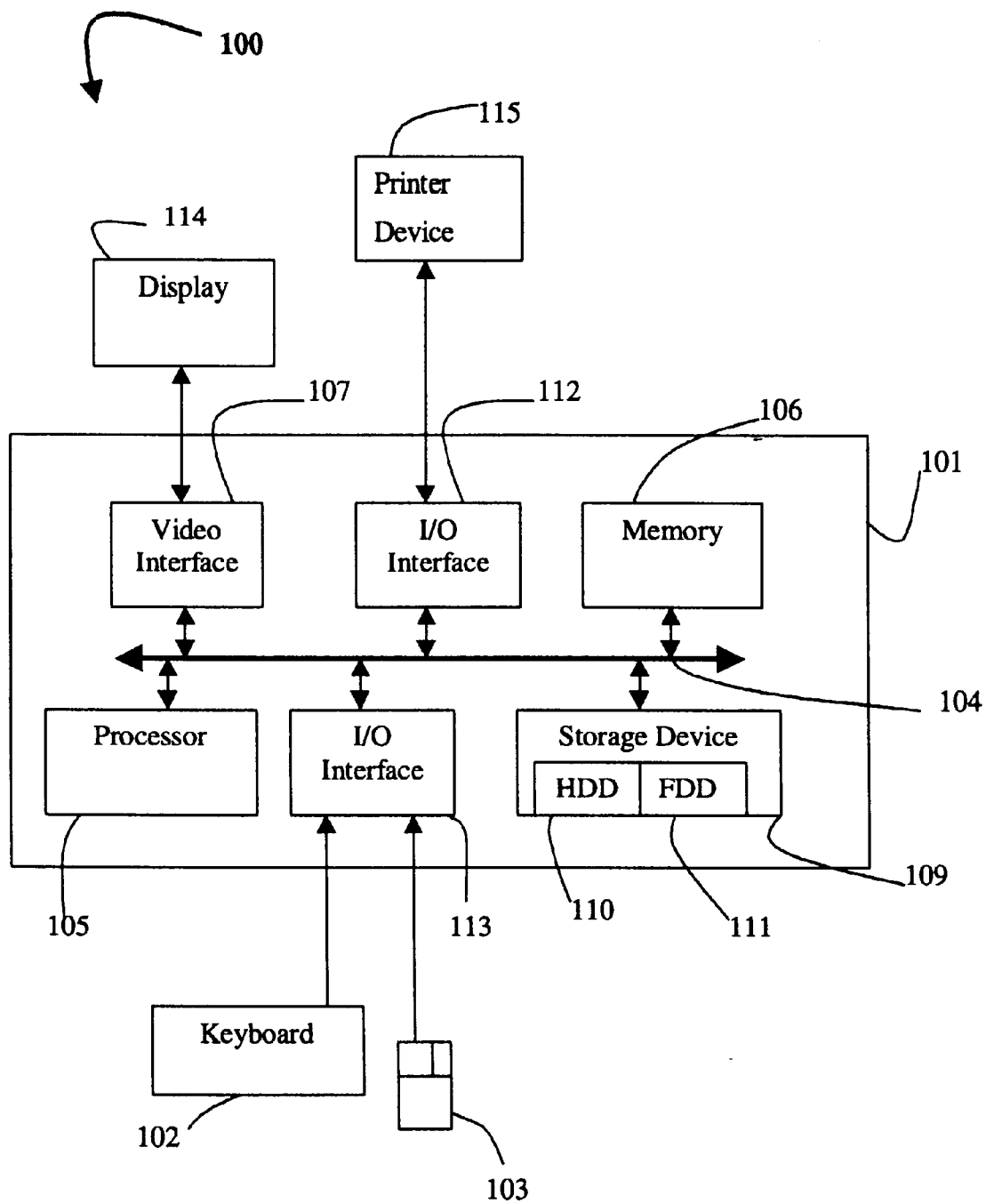
FIG. 1 is a schematic block diagram of a conventional general-purpose computer system upon which the embodiment of the invention may be practised.

A general-purpose computer system 100, upon which the preferred embodiment of the invention may be practised, is shown in FIG. 1. The computer system 100 will first be described, followed more particularly by a description of a method of automatic conversion of units in a computer program.

This method may be implemented as software, such as an application program executing within the computer system 100. In particular, the steps of the method of automatic conversion of units in a computer program are effected by instructions in the software that are carried out by the computer system 100. The software may be stored in a computer readable medium, including the storage devices described below, for example. The software is loaded into the computer system 100 from the computer readable medium, and then executed by the computer system 100. A computer readable medium having such software or computer program recorded on it is a computer program product. The use of the computer program product in the computer preferably effects an advantageous apparatus for automatic conversion of units in a computer program, in accordance with the embodiments of the invention.

The computer system 100 comprises a computer module 101, input devices such as a keyboard 102 and mouse 103, and output devices including a printer 115 and a display device 114. The computer module 101 typically includes at least one processor unit 105, a memory unit 106, for example formed from semiconductor random access memory (RAM) and read only memory (ROM), input/output (I/O) interfaces including a video interface 107, an I/O interface 112 for the printer device 115 and an I/O interface 113 for the keyboard 102 and mouse 103. A storage device 109 is provided and typically includes a hard disk drive 110 and a floppy disk drive 111. A CD-ROM drive (not illustrated) may be provided as a non-volatile source of data. The components 105 to 113 of the computer module 101, typically communicate via an interconnected bus 104 and in a manner which results in a conventional mode of operation of the computer system 100 known to those in the relevant art.

Typically, the application program of the preferred embodiment is resident on the hard disk drive 110, and read and controlled in its execution by the processor 105. Intermediate storage of the program may be accomplished using the semiconductor memory 106, possibly in concert with the hard disk drive 110. In some instances, the application program may be supplied to the user encoded on a CD-ROM or floppy disk and read via a CD-ROM drive (not illustrated) or floppy disk drive 111, or alternatively may be read by the user from the network (not illustrated) via the modem device (not illustrated). Still further, the software can also be loaded into the computer system 100 from other computer readable medium including magnetic tape, a ROM or integrated circuit, a magneto-optical disk, a radio or infra-red transmission channel between the computer module 101 and another device, a computer readable card such as a PCMCIA card, and the Internet and Intranets including e-mail transmissions and information recorded on websites and the like.

The foregoing is merely exemplary of relevant computer readable mediums. Other computer readable mediums may be practiced without departing from the scope and spirit of the invention.

Having described the hardware environment of the invention, the method of automatic conversion of units in a computer program will now be described.

Problem Statement

Given a computer program containing:

a set $v=\{v_1, v_2, \ldots, v_n\}$ of variables, where $V_j$, j=1, ..., n, is a variable or a deemed variable;

a corresponding set of units $S=\{s_1, s_2, \ldots, s_n\}$, where $s_j$ is the units in which variable $v_j$ is expressed;

a set of primary units $U=\{u_1, u_2, \ldots, u_p\}$; and a set of lists of affiliated units $L=\{l_1, l_2, \ldots, l_p\}$, corresponding to the set of primary units U, where the list of affiliated units $l_k$, k=1, ..., p, has at its head the primary unit $u_k$ followed by other affiliated units $w_1, w_2, \ldots, w_q$, each of which is an alternative proportionate measure of the primary unit $u_k$, along with their corresponding to-primary numerical conversion factors $c_1, c_2, \ldots, c_q$, which convert an affiliated unit $w_j$, j=1, ..., q, to primary unit $u_k$. In this sense, $w_j$ and $c_j$ are to be viewed as functions of $u_k$, that is, $w_j=w_j(u_k)$ and $c_j=c_j(u_k)$.

For a given list of affiliated units l, let the primary unit at its head be u and let its affiliated units be $w_1, w_2, \ldots, W_q$, each of which has associated with it, respectively, the to primary conversion factors $c_1, c_2, \ldots, c_q$, through which it converts to primary unit u. Then, the list of affiliated units l is the array of strings {"u:1", "$w_1:c_1$", "$w_2:c_2$", ..., "$w_q:c_q$"}. Since the conversion factor for u to itself is 1, it appears at the head of list of affiliated units l as the string element "u:1", and a string element "$w_i:c_i$" represents the fact that one unit of $w_i$ is equal to $c_i$ units of u.

The embodiment of the invention introduces in the computer program, wherever necessary, such conversion factors $c_j$ as would ensure that computations in the computer program are carried out in a consistent manner, and preferably in terms of the primary units $u_k$.

Likewise, if the computer program contains functions, then each function is deemed as a variable and the function names, or a suitably encoded form of them, are also included in the variable set V. The units attached to such variables are the units carried by the return values of the respective functions.

Precompiler Directives

In the preferred embodiment of the invention, the method is performed using a set of user-supplied precompiler directives. The precompiler directives are added to the computer program that is to be converted, where they can be detected and processed by a precompiler tool. The precompiler tool of the preferred embodiment is executed before the compilation of the computer program.

The precompiler directives are preferably introduced as specially formatted comments into the computer program, recognizable by the precompiler tool. This allows even existing computer programs, with little or no modification, to make use of the precompiler tool.

The only code modification required to be made in the computer program is when a numerical constant has units and appears in numerical form in the computer program. In such instances, the constants are replaced with appropriately assigned variable names, the variable names not being in conflict with already used variable names in the computer program. The variables are assigned their constant values through assignment statements placed prior to the first use of the constants in the computer program. In addition, such introduced variable names are also included, along with the existing variable names in the program, in the variable set V.

For example, all occurrences of a constant 2.5 with units, say, sec, may be replaced by a variable c1, where the variable name c1 does not conflict with other variable names in the program, c1 is assigned the value 2.5 before its first use, and a precompiler directive is introduced for the variable c1.

C and C++ programming language conventions will be used to illustrate the formatting procedure for the precompiler directives. The formatting procedure may be modified to suit computer programs written in these or other programming languages and/or the preferences of the precompiler tool designer.

There are five forms of precompiler directives, namely those for declaration of primary units, for declaration of unit list, for declaration of variables and their associated units, for declaration of functions and their associated units, and for declaration of function parameters, each of which will be described separately.

Precompiler Directive for Declaration of Primary Units

The precompiler directive for the declaration of primary units takes the syntactical form of:

//$p_units units_list where //$p_units indicates that this comment is a precompiler directive for declaring the primary units to be used in the computer program, and units_list is a character string which contains a list (set) $U=\{u_1, u_2, \ldots, u_p\}$ of primary units, each unit $u_j$, $j=1, 2, \ldots, p$ separated from the next by a blank space. For example, if the list of primary units $\{u_1, u_2, u_3\}=\{kg, m, sec\}$, then its declaration would appear as //$p_units kg m sec It is noted that there must be at least one blank space between the keyword //$p_units and the first unit $u_1$ in the units list. Since this declaration is valid for the entire program, it must be placed accordingly in the program to reflect its global scope.

Precompiler Directive for Declaration of Unit List

The precompiler directive for the declaration of unit lists $l_k$ takes the syntactical form of:

//$unit_list unit_conv_list where //$unit_list indicates that this comment is a precompiler directive for declaring a list of the affiliated units $l_k$ of a primary unit $u_k$ appearing in an earlier precompiler directive for the declaration of primary units, and unit_conv_list is a character string which contains at its head the string "$u_k$:1" followed by substrings, each containing one of the affiliated units $w_i$ and it's corresponding conversion factor $c_i$, each substring being in the form "$w_i:c_i$" and separated from the next by a blank space. For example, if kg is the primary unit and gm, ton (metric), lb, oz are its affiliated units, then the declaration would appear as //$unit_list kg:1 gm:0.001 ton(metric):1000 lb:0.453592 oz:0.0283495

It is noted that no blank spaces are permitted within a substring of the unit_conv_list and that there be at least one blank space between the keyword //$unit_list and the first substring in the unit_conv_list. Since this declaration is valid for the entire computer program, it must be placed accordingly in the computer program to reflect its global scope and, preferably, after the declaration of the primary units and grouped with it for ease of comprehension.

Likewise, the declarations of the affiliated units of m, and sec would appear as //$unit_list m:1 km:1000 cm:0.01 ft:0.3048 in:0.0254 chain:20.1168

//$unit_list sec:1 min:60 hr:3600 day:86400 ms:0.001

Precompiler Directive for Declaration of Variables and Their Associated Units

The precompiler directive for a variable $v_j$ takes the syntactical form of:

//$ var_name units_strg where //$ indicates that this comment is a precompiler directive, var_name is the name of a variable $v_j$ used in the computer program and units_strg is a character string which contains the units $s_j$ of the variable $v_j$. For example, if the variable $v_j$ has units $m^2$/sec, then its units_strg would be "m*m/sec". If the variable $v_j$ does not carry any units, then its units_strg is the null string " ". For each program variable $v_j$, a precompiler directive must appear somewhere within the scope of the variable $v_j$ in the computer program, but prior to the variable's first use within its scope. It is preferable to group the directives of variables of like scope at the beginning of the scope for ease of readability and comprehension. There should be at least one blank space separating //$, var_name and units_strg. The contents of units_strg should not have any embedded blank spaces, and there should be no mixing of units from the same group. For example, while "m*m/sec" is correct, "cm*m/sec" is not since 'cm' and 'm' belong to the same group, but have been mixed here.

For example, the precompiler directive for a variable x with units $lb/ft^3$ would be //$ x lb/(ft*ft*ft)

If the same units $s_j$ are associated with more than one variable $v_j$, the precompiler directive could be modified to //$ var_name1,var_name2, . . . ,var_namem unit_strg where var_namei is the i-th variable, and between two variables is a comma separating them. The string var_name1,var_name2, . . . ,var_namem does not contain any blank spaces.

For example, the precompiler directive for variables x, y, z each with units $ft^2$ would be //$ x,y,z ft*ft Precompiler Directive for Declaration of Functions and Their Associated Units The precompiler directive for a function (deemed variable) takes the syntactical form //$ func_name(type_list) units_strg where func_name ( ) is the name of the function and type_list lists the parameter types in the same sequence as they appear in the function's declaration so that the specific instance of the function name being invoked can be identified without ambiguity when the same function name has been used with different sets of parameters as permitted by some modern programming languages such as C++. The type_list can be formatted as a character string without any embedded blanks, and each parameter type separated from the next by a comma. For example, for the function velocity (float distance, float time) the type_list could be represented by the string "float, float". The precompiler directive should be placed within the function's scope and before its first use within that scope. It is noted that between //$ and func_name(type_list) there should be at least one blank space. However, there should be no blank spaces embedded within the contents of func_name(type_list) and units_strg. Because of the similarity in the syntax of the directive for functions and that for variables, one may choose to use func_name(type_list) as an encoded form of a function and treat it as a deemed variable. There should be no mixing of units from the same group in units_strg.

Precompiler Directive for Declaration of Function Parameters and Their Associated Units Finally, for each function, its parameters will also need directives. They could take the following form:

//$ func_name(type_list).par1 units_*strg*

//$ func_name(type_list).par2 units_*strg*

. . . . . . . . . . . .

//$ func_name(type_list).parn units_*strg* where, func_name(type_list).pari, i=1,2, . . . , n, refers to the i-th parameter of the function func_name ( ). These precompiler directives are preferably placed immediately after the directive of their respective function's directive, but in any case within the function's scope and before its first use within that scope. It is noted that between //$ and func_name(type_list).pari there should be at least one blank space, and between func_name(type_list).pari and units_strg, again, at least one blank space. However, there should be no blank spaces embedded within the contents of func_name (type_list) and units_strg. There should be no mixing of units from the same group in units_strg.

For example, the precompiler directives for the function MyFunction(int s_no, float x, float y), where the parameter s_no has no units, and parameters x and y have, respectively, the units cm/sec, ft*lb, would be //$ MyFunction(int,float,float).par1

//$ MyFunction(int,float,float).par2 cm/sec

//$ MyFunction(int,float,float).parn ft*lb

The Precompiler Tool

The precompiler tool provides the means to automatically introduce in a computer program such conversion factors as are necessary to ensure that computations in the program will be carried out in a consistent manner in terms of the given primary units. Eight basic operations are provided, namely:

(1) unitising a variable and a function call;

(2) searching for the primary unit of each unit;

(3) replacing a unit with its to-primary conversion factor;

(4) replacing a unit with a conversion factor to another unit of its group;

(5) converting an expression to its to-primary form;

(6) converting an assignment statement to its to-primary form;

(7) converting a function call to its header form; and (8) converting a function body to its to-primary form.

These operations are defined below.

Unitising a Variable and a Function Call

Let v be a variable and s its units. Then unitising variable v means replacing variable v by the string "(v*$s$)" if units s represents a single unit. If variable v carries a composition of units, say, "m*sec/kg", then unitising variable v means replacing variable v by the string "(v*$m$*$sec$/$kg$)". Note the mandatory enclosing parenthesis in the string construction.

Similarly, unitising a function call $f(a_1, a_2, \ldots, a_r)$ to a function $f(p_1, p_2, \ldots, p_r)$ which returns a value with s as its units means replacing function call $f(a_1, a_2, \ldots, a_r)$ by the string "(f($a_1, a_2, \ldots, a_r$)*$s$)" if s represents a single unit. If function $f(p_1, p_2, \ldots, p_r)$ carries a composition of units, say, "kg/(m*sec)", then unitising function call $f(a_1, a_2, \ldots, a_r)$ means replacing function call $f(a_1, a_2, \ldots, a_r)$ by the string "(f($a_1, a_2, \ldots, a_r$)*$kg$/($m$*$sec$))". The function arguments $a_1, a_2, \ldots, a_r$ are, respectively, the expressions which are used in place of the parameters $p_1, p_2, \ldots, p_r$ when the function is called. Note the mandatory enclosing parenthesis in the string construction. Note also, that in unitising a function, its arguments $a_1, a_2, \ldots, a_r$, if present, are left untouched and the function call $f(a_1, a_2, \ldots, a_r)$ is treated as a variable.

Searching for the Primary Unit of Each Unit

Let s be the unit in question, and let L be a set of lists of affiliated units. Searching for the primary unit u of unit s means finding a list l in the set of lists L in which unit s appears and returning the primary unit u at the head of the list of affiliated units l. If no list of affiliated units l is found, then an error message is provided. It is noted that there will be only one such list of affiliated units l, since primary units u, by definition, are independent of each other.

Replacing a Unit with Its To-primary Conversion Factor

Let s be the unit in question and which resides in the list of affiliated units l. Then replacing unit s with its to-primary conversion factor means replacing the string "$s$" with its conversion factor "c" enclosed in brackets. That is, "$s$" is substituted by the string "(c)".

Replacing a Unit with a Conversion Factor to Another Unit of Its Group

Let s be the unit in question and which resides in the list of affiliated units l. Let t be the unit, which also resides in the list l, to which conversion is sought. Then replacing unit s with a to-primary conversion factor $c_s$, to another unit t with a conversion factor $c_t$, means replacing the string $s$ with the string "($c_s/c_t$)".

Converting an Expression to Its To-primary Form

The to-primary form of an expression is obtained by first unitising all instances of the variables $v_j$ (excluding any instances of variables appearing in function arguments $a_1, a_2, \ldots, a_r$ in a function call $f(a_1, a_2, \ldots, a_r)$) and function calls $f(a_1, a_2, \ldots, a_r)$ appearing in the expression, and then replacing the units $s_j$ in such an unitised expression by their respective to-primary conversion factors $c_j$.

Converting an Assignment Statement to Its To-primary Form

The to-primary form of an assignment statement is obtained by converting both sides of the assignment statement, with each side being treated as an expression, to their respective to-primary forms. The left hand side of an assignment statement, which can only be a variable $v_j$, now has a to-primary conversion factor $c_j$ multiplied to it. Therefore, both sides of the assignment statement are now divided by this multiplying factor $c_j$ so that the left hand side is once again back to being a single variable $v_j$. This final form of the assignment statement is termed the to-primary form of the assignment statement.

It is noted that in the to-primary form of an assignment statement, the left hand side variable $v_j$ continues to possess its original units $s_j$, that is, the units $s_j$ provided in the variable's precompiler directive, thus ensuring that the variable's subsequent appearances in the program will be correctly interpreted in terms of its units $s_j$.

Converting a Function Call to Its Header Form

A function call, $f(a_1, a_2, \ldots, a_r)$, is converted to its header form by treating each of its arguments $a_1, a_2, \ldots, a_r$, if any, as an expression. It is assumed that the arguments $a_1, a_2, \ldots, a_r$, in themselves do not have function calls embedded within. For each argument $a_i$, the following steps are performed:

1. if the units in which $a_i$ is expressed at the time of the function call $f(a_1, a_2, \ldots, a_r)$ match with the units in the units_strg part of the function's precompiler directive for the declaration of function parameters corresponding to the parameter $p_i$, then no further action is required; otherwise create a set of parameter units P comprising the primary and affiliated units appearing in units_strg and go to step 2;
2. unitise all variables appearing in the argument expression $a_i$;
3. replace each unit in the unitised expression of the argument expression $a_i$ with its conversion factor to its corresponding unit in the set of parameter units P.

As an example, consider the function $f(x)$, where the precompiler directive for the parameter x is //$ $f$(int).par1 lb*lb/ft and function $f(x)$ appears in an expression $b*f(a)$, where the units of the argument expression a are "gm*gm/cm". To convert function call $f(a)$ to its header form, it is first checked whether the units in which argument expression a is expressed, which are cm and gm, match the units in which parameter x is expressed, which are ft and lb from the precompiler directive. Since in this example the comparison fails, a set P={"lb", "ft"} is created from the precompiler directive. Next, the parameter expression a is unitised by replacing it with the string "(a*$gm$*$gm$/$cm$)" so that the function call $f(a)$ becomes $f((a*\$gm\$*\$gm\$/\$cm\$))$. In the final step, the units in the unitised parameter are replaced by their respective conversion factors to corresponding units in set P. Thus $gm$ if replaced by "(0.001/0.453592)" to convert gm to lb and $cm$ is replaced by "(0.01/0.3048)" to convert cm to ft so that finally the function call has the form $f((a*(0.001/0.453592)*(0.001/0.453592)/(0.01/0.3048)))$.

Converting a Function Body to Its To-primary Form

The function declaration part of a function definition is left untouched. The statements within the function body are converted to their to-primary forms by converting expressions and assignment statements to their to-primary forms, and function calls are converted to their header forms. All values returned by a return statement in a function are converted to the function's return units.

Figure 2:
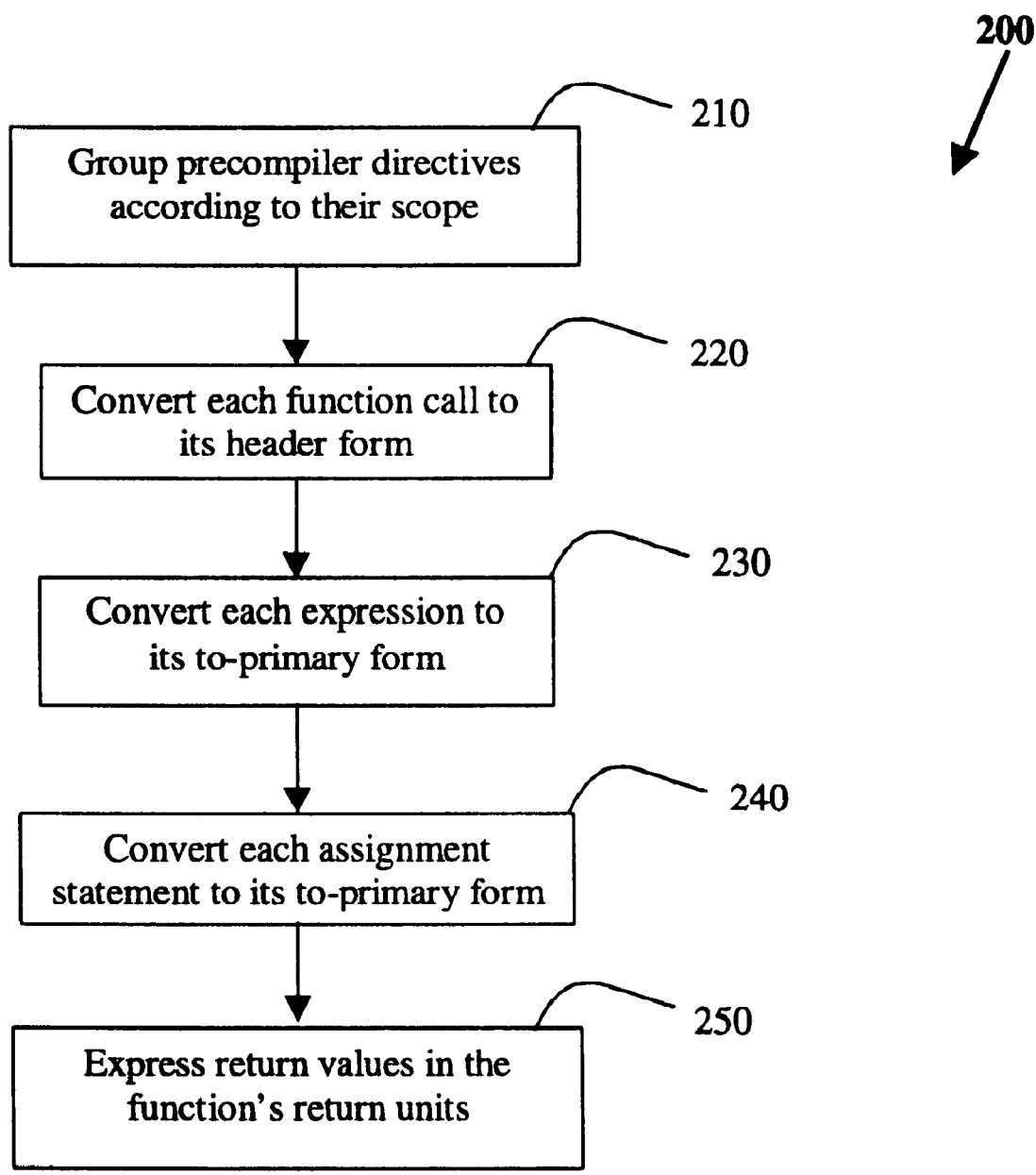
FIG. 2 shows a flow diagram of a method of automatic conversion of units in a computer program.

Referring to FIG. 2, a flow diagram is shown of a method 200, performed on each subprogram (that is, on each function definition and the main program) comprising a computer program by the precompiler tool, of automatic conversion of units in a computer program. After the precompiler directives have been added, and constants having units have been replaced with appropriately assigned variable names in the computer program, the method starts in step 210 by grouping the precompiler directives according to their scopes in the subprogram. This is done by grouping each precompiler directive at the head of the block in the subprogram to which it relates, if it is not already grouped there.

Next, the subprogram's body is converted to its to-primary form. Step 220 converts all function calls in the subprogram to their respective header forms. Each expression instance in the subprogram, except when the instance is an argument expression, is converted in step 230 into its to-primary form. Step 240 converts each assignment statement into its to-primary form. Finally, step 250 expresses all values returned by a return statement in the function's return units.

After the precompiler tool has performed the above steps 210–250, a compiler is directed to execute the converted computer program.

EXAMPLES

Example 1

Consider a computer program, for which the primary units set is $U=\{$"kg", "m", "sec"$\}$, the lists of affiliated units are $l_1=\{$"kg:1", "gm:0.001", "ton(metric):1000", "lb:0.453592"$\}$, $l_2=\{$"m:1", "km:1000", "cm:0.01", "ft:0.3048", "in:0.0254", "chain:20.1168"$\}$, and $l_3=\{$"sec:1", "min:60", "hr:3600", "day:86400", "ms:0.001"$\}$, the variables set is $V=\{a, b, c, d, e\}$ and the corresponding units set is $S=\{$"lb", "lb/sec", "hr", "1/(min*min)", " "$\}$.

Let $a=b*c+a*d*c/b$, be an assignment statement is such a program.

Firstly, a precompiler directive for the declaration of primary units kg, m, and sec in the primary units set U of the program are added as:

//$p_units kg m sec

Then, the precompiler directives for declaration of the unit lists $l_1$, $l_2$, and $l_3$, respectively, are added as:

//$unit_list kg:1 gm:0.001 ton(metric):1000 lb:0.453592 oz:0.0283495

//$unit_list m:1 km:1000 cm:0.01 ft:0.3048 in:0.0254 chain:20.1168

//$unit_list sec:1 min:60 hr:3600 day:86400 ms:0.001

The four precompiler directives are placed at the head of the program to signify global scope. Next, the precompiler directives for declaration of the variables a, b, c, d, e and their associated units are added according to their scopes in the program as:

//$ $a$ lb

//$ $b$ lb/sec

//$ $c$ hr

//$ $d$ 1/(min*min)

//$ $e$

With the precompiler directives in place, the precompiler tools starts with the conversion of the assignment statement into its to-primary form, by scanning the assignment statement from one end to the other and searching for variable names. In the assignment statement under consideration, the precompiler tool will encounter variable a first. Variable a is unitised by replacing it with "(a*$lb$)". Then, variable b is found and unitised by replacing it with "(b*$lb$/$sec$)". The precompiler tool continues similarly with variables c, a, d, c, and finally, b as they are encountered in the assignment statement, replacing them respectively by the strings "(c*$hr$)", "(a*$lb$)", "(d*1/($min$*$min$))", "(c*$hr$)", and "(b*$lb$/$sec$)".

After unitising the variables, the assignment statement is transformed to:

$$(a*\$lb\$)=(b*\$lb\$/\$sec\$)*(c*\$hr\$)+(a*\$lb\$)*(d*1/(\$min\$*\$min\$))*(c*\$hr\$)/(b*\$lb\$/\$sec\$).$$

Next, for each unit in the above expression, the precompiler tool looks up the lists $l_1$, $l_2$ and $l_3$, which are encoded in the precompiler directives //$unit_list, to find the list $l_1$, $l_2$ or $l_3$ in which the unit appears. Thus unit "lb" is found in list $l_1$, "sec" in $l_3$, "hr" in $l_3$, and "min" in $l_3$. When a unit s is found in a list, all instances of the substring $s$ are replaced by its to-primary conversion factor string $c_i$ enclosed in brackets. Thus, when "lb" is found, all instances of "$lb$" are replaced by "(0.453592)" leading to $$(a*(0.453592))=(b*(0.453592)/\$sec\$)*(c*\$hr\$)+(a*(0.453592))*(d*1/(\$min\$*\$min\$))*(c*\$hr\$)/(b*(0.453592)/\$sec\$).$$

Likewise, after conversion of units "min", "sec", and "hr", the final result after replacing all the units with their to-primary conversion factors is:

$$(a*(0.453592))=(b*(0.453592)/(1))*(c*(3600))+(a*(0.453592))*(d*1/((60)*(60)))*(c*(3600))/(b*(0.453592)/(1)).$$

With the conversion factors in place, the variables are now deemed to have been expressed in primary units. However, in assignment statements, an additional operation is necessary since the left hand side of an assignment statement must be a single variable. The statement is reconstructed so that the factors which are attached to the left hand side variable are transferred to the right hand side as a right hand side denominator. Thus, the above assignment statement is restated as $$a=((b*(0.453592)/(1))*(c*(3600))+(a*(0.453592))*(d*1/((60)*(60)))*(c*(3600))/(b*(0.453592)/(1)))/(0.453592).$$

Example 2

Consider the assignment statement of Example 1, but where the first term on the right hand side of the assignment statement is replaced by a function f(x+z, y) which returns the value of b*c. Thus the assignment statement is $$a=f(x+z,\ y)+a*d*c/b,$$

where f(x+z, y) implies a call to the function f(b, c) which has the definition:

float f(float b, float c) //This line is the function's declaration.
{ //Contents within curly brackets form the float g, h; //function's body.
g=b;
h=c;
return g*h;.
}

The new variables x, z and y, respectively, have the units "oz/min", "lb/sec" and "min". In the function definition above, the function f(b,c) returns a value with the unit "lb", and its parameters b and c, respectively, have the units "lb/sec" and "hr". Within the function's body, the variables g and h, respectively, have the units "lb/sec" and "hr".

The precompiler directives for the primary units $u_i$ in the primary units set U and the lists $l_1$, $l_2$, and $l_3$ will remain as before. The precompiler directives for the variables are augmented with the directives for the new variables x, z and y as follows:

//$ $a$ lb

//$ $b$ lb/sec

//$ $c$ hr

//$ $d$ 1/(min*min)

//$ $e$

//$ $x$ oz/min

//$ $z$ lb/sec

//$ $y$ min

The precompiler directive for declaration of the function is

//$ $f$(float,float) lb and the precompiler directives for declaration of the function's parameters are //$ $f$(float,float).par1 lb/sec //$ $f$(float,float).par2 hr The above three precompiler directives are placed so as to signify their global scope in the computer program. Unit conversion operations are not done on the parameters of a function's declaration. Within the function's body, local precompiler directives for the function's local variables g and h are added, which are //$ $g$ lb/sec //$ $h$ hr which are placed inside the function f so that they appear before they are used in a statement within the function. In the particular example, the precompiler tool modifies the function's contents as shown below.

float f(float b, float c)
{
  //$ $g$ lb/sec
  //$ $h$ hr float g, h;
  g=b;
  h=c;
  return g*h;.

}

The precompiler tool now proceeds to convert the function's body to its to-primary form. This means that the two assignment statements g=b and h=c, and the expression g*h must be converted. After carrying out the conversion, the function will look as follows:

float f(float b, float c)
{
  //$ g lb/sec
  //$ h hr float g, h;
  g=((b*(0.453592)/(1)))/((0.453592)/(1));
  h=((c*(3600)))/((3600));
  return ((g*(0.453592)/(1))*(h*(3600)))*(1/0.453592);
}

In the above return statement, the part (g*(0.453592)/(1))*(h*(3600)) converts the units of statement g*h into primary units, and the terminal factor (1/0.453592) converts it back to the specified units (lb) for the return value of the function. It is noted in particular that, when this function is executed the return value will be in terms of the original units specified for the return value, namely lb.

The precompiler tool now, performing step 220, converts the function call f(x+z, y) in the assignment statement a=f(x+z, y)+a*d*c/b into its header form. The function call f(x+z, y) is converted to its header form by picking up the first function argument in the function call. This is x+z, which has a curious mixture of units where variable x is in "oz/min" and variable z is in "lb/sec". Clearly, the mixture of units does not correspond to the units "lb/sec" given in the units_strg part of the precompiler directive for the declaration of the first function parameter, namely f(float, float) .par1 lb/sec. Therefore, the precompiler tool creates the set of parameter units P={"lb", "sec"} and proceeds to convert the units of the function argument x+z to units "lb/sec". Since the units of variable x are "oz/min" and those of variable z are "lb/sec", only the units of variable x need to be converted to "lb/sec" but not those of variable z.

Accordingly, function argument x+z is first unitised to string "(x*$oz$/$min$)+(z*$lb$/$sec$)". Then each unit is picked up one by one. The first is $oz$, so the set of parameter units P is searched for "oz" and since it is not found in the set of parameter units P, the list $l_i$ to which "oz" belongs is determined and found to be $l_1$. Therefore, list $l_1$ is searched for a unit belonging to set P and is found to be "lb". Therefore, the unit "oz" is replaced by its conversion factor to the unit "lb", that is, $oz$ is replaced by the string "(0.0283495/0.453592)", which is the ratio of the to-primary coversion factor for "oz" being (0.0283495) and the to-primary conversion factor for "lb" being (0.453592). The string is now "(x*(0.0283495/0.453592)/$min$)+(z*$lb$/$sec$)".

The next unit is $min$ which is found to be in list $l_3$ but not in the set of parameter units P. Therefore, list $l_3$ is searched for a unit belonging to set P and is found to be "sec". Therefore $min$ is replaced by the string "(60/1)", and the string is now "(x*(0.0283495/0.453592)/(60/1))+(z*$lb$/$sec$)".

The first unit of variable z is found to be "lb" which is found in set P, hence $lb$ is replaced by the string "(1/1)". Alternatively, the precompiler tool may delete $lb$ along with its preceding operator '*'. The string is now "(x*(0.0283495/0.453592)/(60/1))+(z/$sec$)", where the deletion option has been chosen.

The next unit of variable z is "sec", which is also in set P, hence $sec$ along with its preceding division operator '/' is deleted. The parameter "x+z" is thus converted to "(x*(0.0283495/0.453592)/(60/1))+(z)"

Likewise, for the second argument y, the precompiler tool creates a set of parameter units P={"hr"} and converts the argument y to "(y*(60/3600))" to make its units commensurate with those of the second parameter as given in the precompiler directive.

The header form of the function call is thus $$f((x*(0.0283495/0.453592)/(60/1))+(z), (y*(60/3600))).$$

Performing step 240, the precompiler tool converts the assignment statement into its to-primary form, by scanning the assignment statement from one end to the other and searching for variable names and function calls. In the assignment statement under consideration, the precompiler tool will encounter variable a first, which is unitised by replacing it with "(a*$lb$)". Then, function call f(x+z,y) is found, which must be unitised and converted to its to-primary form. The precompiler directive for the function provides its units as "lb", so unitisation of the function call f(x+z,y) provides $$(f((x*(0.0283495/0.453592)/(60/1))+(z), (y*(60/3600)))*\$lb\$)$$

and the to-primary form is obtained by replacing "$lb$" with "(0.453592)". Thus, the function call takes its final form as $$(f((x*(0.0283495/0.453592)/(60/1))+(z), (y*(60/3600)))*(0.453592)).$$

The precompiler tool continues similarly with variables a, d, c, and finally, b as they are encountered in the assignment statement, replacing them respectively by the strings "(a*$lb$)", "(d*1/($min$*$min$))", "(c*$hr$)", and "(b*$lb$/$sec$)".

The remainder of the assignment statement can be handled as already described in Example 1.

An embodiment of the present invention can be advantageously used to:

Simplify and automate the conversion of legacy software systems to new unit standards, for example, from the foot-lb-sec system to metre-kg-sec system.

Ensure that a preferred set of units are used throughout a computer program by the automatic introduction of unit conversion factors in the program as appropriate.

Allow domain experts to work in the units of their choice in which they often have a special feel without worrying about their conversion to the preferred set of units.

Through an appropriate user interface, outputs may be presented in units of one's choice.

Embodiments of the invention can be implemented within compilers, for example. As is well known, a compiler generates machine executable object code from high-level source code, written in languages such as C++ and Java™.

The foregoing describes only one embodiment of the present invention, and modifications and/or changes can be made thereto without departing from the scope and spirit of the invention, the embodiments being illustrative and not restrictive.

I claim:

1. A method of converting units in a computer program, said method comprising the steps of:

(a1) accepting as input a unit identifier for each variable used in said computer program, wherein each unit identifier comprises one or more unit elements;

(a2) accepting as input a primary unit element from each group of unit elements;

(a3) accepting as input a relation between each of said unit elements and one of said groups of unit elements and a conversion factor to said primary unit element of said group of unit elements;

(d) identifying instances of said variables in said computer program;

(e) augmenting said instances of said variables with a corresponding one of said unit identifiers; and (f) identifying, for each unit element, one of said groups of units and replacing said unit element with said primary unit identifier of the respective group, multiplied with said conversion factor.

2. The method according to claim 1, wherein said computer program further includes at least one assignment statement, said method, for each assignment statement, comprising the further step of:

(h) dividing both sides of said assignment statement with the conversion factor(s) on the left hand side of the assignment statement.

3. The method according to claim 1, wherein said computer program includes at least one function, said method, for each function, comprising the further steps of:

(a4) accepting as input a unit identifier for said function;

(a5) accepting as input a unit identifier for each parameter of said function;

(b) in a function body of said function, converting units by:

(b1) identifying instances of said variables in said function body;

(b2) augmenting said instances of said variables with a corresponding one of said unit identifiers;

(b3) identifying for each unit element, one of said groups of units and replacing said unit element with said primary unit identifier, multiplied with said conversion factor;

(b4) for each assignment statement in said function body, dividing both sides of said assignment statement with the conversion factor(s) on the left hand side of the assignment statement; and (b5) dividing a return statement of said function body with conversion factor(s) of said unit identifier for said function;

(c1) identifying instances of arguments in function calls of said function in said computer program;

(c2) augmenting said instances of said arguments with a corresponding one of said unit identifiers; and (c3) identifying for each unit element, one of said groups of units and replacing said unit element with said primary unit identifier, multiplied with said conversion factor;

(g1) identifying instances of said function call in said computer program;

(g2) augmenting said instances of said function call with a corresponding one of said unit identifiers; and (g3) identifying for each unit element, one of said groups of units and replacing said unit element with said primary unit identifier, multiplied with said conversion factor.

4. Apparatus for converting units in a computer program, said apparatus comprising: input means for:

accepting as input a unit identifier for each variable used in said computer program, wherein each unit identifier comprises one or more unit elements;

accepting as input a primary unit element from each group of unit elements; and accepting as input a relation between each of said unit elements and one of said groups of unit elements and a conversion factor to said primary unit element of said group of unit elements;

means for identifying instances of said variables in said computer program;

means for augmenting said instances of said variables with a corresponding one of said unit identifiers; and means for identifying for each unit element, one of said groups of units and replacing said unit element with said primary unit identifier, multiplied with said conversion factor.

5. The apparatus according to claim 4, wherein said computer program further includes at least one assignment statement, said apparatus, for each assignment statement, further comprising:

means for dividing both sides of said assignment statement with the conversion factor(s) on the left hand side of the assignment statement.

6. The apparatus according to claim 4, wherein said computer program includes at least one function, said apparatus, for each function, further comprising:

said input means further:
  accepting as input a unit identifier for said function; and
  accepting as input a unit identifier for each parameter of said function;

means for converting units in a function body of said function;

means for identifying instances of arguments in function calls of said function in said computer program;

means for augmenting said instances of said arguments with a corresponding one of said unit identifiers; and means for identifying for each unit element, one of said groups of units and replacing said unit element with said primary unit identifier, multiplied with said conversion factor;

means for identifying instances of said function call in said computer program;

means for augmenting said instances of said function call with a corresponding one of said unit identifiers; and means for identifying for each unit element, one of said groups of units and replacing said unit element with said primary unit identifier, multiplied with said conversion factor.

7. The apparatus according to claim 6, wherein said means for converting units in said function body of said function comprises:

means for identifying instances of said variables in said function body;

means for augmenting said instances of said variables with a corresponding one of said unit identifiers;

means for identifying for each unit element, one of said groups of units and replacing said unit element with said primary unit identifier, multiplied with said conversion factor;

means for, for each assignment statement in said function body, dividing both sides of said assignment statement with the conversion factor(s) on the left hand side of the assignment statement; and means for dividing a return statement of said function body with conversion factor(s) of said unit identifier for said function.

8. A computer program product, carried on a storage medium, for converting units in a subject computer program, comprising:

first program means for identifying instances of variables in said subject computer program;

second program means for augmenting said instances of said variables with a corresponding one of a set of unit identifiers; and third program means for, for each unit element, identifying one of a groups of units to which it belongs, and replacing said unit element with a respective primary unit identifier multiplied with a respective conversion factor.

9. The computer program product of claim 8, further comprising:

fourth program means for accepting, as input, said set of unit identifiers, said set of primary unit identifiers, a set of membership relationships between unit elements and said groups of elements, and said conversion factors.

10. A method for converting units in a subject computer program, comprising the steps of:

identifying instances of variables in said subject computer program;

augmenting said instances of said variables with a corresponding one of a set of unit identifiers; and for each unit element, identifying one of a groups of units to which it belongs, and replacing said unit element with a respective primary unit identifier multiplied with a respective conversion factor.

11. The method of claim 10 comprising the further initial step of:

accepting, as input, said set of unit identifiers, said set of primary unit identifiers, a set of membership relationships between unit elements and said groups of elements, and said conversion factors.

12. A precompiler for converting units in a subject computer program, comprising:

means for identifying instances of variables in said subject computer program;

means for augmenting said instances of said variables with a corresponding one of a set of unit identifiers; and means for, for each unit element, identifying one of a groups of units to which it belongs, and replacing said unit element with a respective primary unit identifier multiplied with a respective conversion factor.

13. The computer program product of claim 12, further comprising:

means for accepting, as input, said set of unit identifiers, said set of primary unit identifiers, a set of membership relationships between unit elements and said groups of elements, and said conversion factors.

* * * * *